Aug. 12, 1969  A. J. BALON  3,460,804

VALVE AND TUBE ASSEMBLY

Filed Oct. 22, 1965

INVENTOR.
ALBERT J. BALON
BY Bosworth, Sessions,
Herrstrom & Knowles
ATTORNEYS

United States Patent Office 3,460,804
Patented Aug. 12, 1969

3,460,804
VALVE AND TUBE ASSEMBLY
Albert J. Balon, 9717 Greenhaven Parkway,
Brecksville, Ohio 44141
Filed Oct. 22, 1965, Ser. No. 501,545
Int. Cl. F16k *31/00;* F16l *27/08;* F23q *9/12*
U.S. Cl. 251—340                                12 Claims

ABSTRACT OF THE DISCLOSURE

A fitting for connecting a gas tube to a threaded socket. The fitting having a closed end, a hollow interior, external threads for engaging the socket threads, a bore intermediate the closed end and the threads to provide communication with the interior of the fitting and a shank having a greater external diameter of the socket threads and more remote from the closed end than the fitting threads and engaging and deforming the socket threads and such a fitting with a flange extending parallel with the tube and having an end inbiting rotatable engagement with the tube and defining a relief in which sealant is disposed about the tube and within the fitting.

---

This invention relates to gas stoves and more particularly to a new and improved gas stove valve and tube assembly for pilot lights and the like.

It is a general object of this invention to provide a new and improved valve and tube assembly for gas stoves, and the like, obtaining unobvious and unexpected benefits and advantages over prior assemblies.

Another object of this invention is to provide a new and improved valve and tube assembly for gas stoves, and the like, including a new and improved valve and connector for connecting the assembly to the manifold for controlling the flow of a gas into the assembly and a new and improved housing and mounting for the pilot light.

Still further objects of this invention include the provision of a new and improved pilot light housing and mounting for a valve and tube assembly for a gas stove, and the like, and the provision of such a pilot light housing and mounting which is efficient and effective in operation; which is economically manufactured and used; which is simple and foolproof in operation; which simplifies and improves the housing and mounting structure of prior art gas stove valve and tube assemblies; which requires no additional washers, nuts and the like for mounting on the stove, and the like; which complies with accepted safety standards and codes for both installation and use; and which may be used in and with a valve and tube assembly including a valve embodying this invention.

Other objects of this invention include the provision of a new and improved valve and connector for a valve and tube assembly for a gas stove, and the like, and the provision of such a valve which is efficient and effective in operation; which is economically manufactured and used; which is safe, simple and foolproof in operation; which is easily adjusted to control or stop the flow of gas through the line; which has only a single moving part yet comprises both valve and coupling or connector by which the valve and tube assembly is secured to the filter, manifold or source of gas supply; which simplifies and improves the valve and coupling structure of prior art gas stove valve and tube assemblies; which complies with accepted safety standards and codes for both manufacture and use; which is simply and effectively mounted on and carried by the tube; and which may be used in and with a valve and tube assembly including a pilot light housing embodying this invention.

Still other objects of this invention include the provision of a new and improved valve for valve and tube assemblies for gas stoves, and the like, which also functions as a connector or coupling between the tube and gas source; which provides a rotatable or swiveling joint between the tube and valve fitting; which provides a safe and leakproof rotatable or swiveling joint between the tube and valve fitting; which provides an axial connection and interconnection between the gas source and the tube; which provides a range of adjustable flow control including no flow; which is adjustable without danger of leakage from the connector; which provides for simple and relative adjustment for a plurality of assemblies from a single filter or distributor so as to obviate the need for equal length pilot light tube assemblies; and which provides a new and improved seal between the valve and the socket within which the same is mounted.

Other objects of this invention include the provision of a new and improved valve for valve and tube assemblies, and the like, which is an axially acting valve providing a new and improved seal between the valve and the valve socket; which provides a safe and effective seal between valve and socket wherein the valve is adjustable without destruction of the seal; which utilizes the forces of the gas pressure in the source and resistance to tightening the valve into the socket to provide a better and more efficient seal; which has structure providing fast bleeding of the tube and when the valve is turned on; which is easily positioned and mounted in a complementary socket of a supply source; and which is a new and unobvious structure obtaining new objects and advantages with new simplicity and at reduced cost.

Still another object of this invention is to provide a new and improved valve and tube assembly for gas stoves, and the like, obtaining one or more of the objects and advantages set forth above.

These and other objects and advantages of this invention will appear from the following description of preferred forms thereof; reference being had to the accompanying drawings in which.

This invention is useful in gas cooking stoves, and the like, and comprises a new and improved valve and tube assembly for a gas pilot light, and the like, including a new and improved valve and connector and a new and improved pilot housing and mounting structure.

Figure 1:
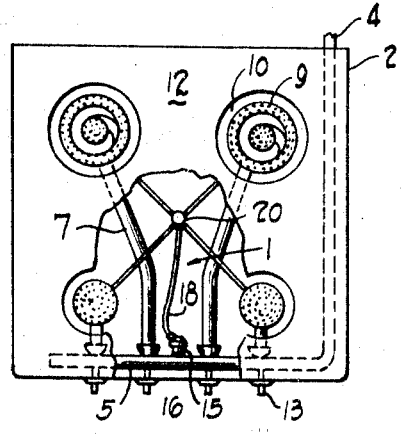
FIGURE 1 is a plan view, partly broken away, of a stove having a tube and valve assembly embodying a preferred form of this invention.

A valve and tube assembly, indicated generally at 1, FIGURE 1, embodying this invention is shown, by way of example, in use on a conventional gas stove 2, having a gas supply line 4 terminating in a conventional manifold 5 from which a plurality of branch, feed or supply lines 7 lead to the respective burners 9, which are situated in openings 10 in stove top 12. Lines 7 are controlled, respectively, by valves 13. When a valve 13 is opened and the gas flows to the respective burner 9, the same is lighted by a pilot light which is also supplied from manifold 5 via a combination filter and distributor 15. Filter 15 is provided with a single threaded inlet 16 (FIGURE 3) for connection with manifold 5 and a number of tapped sockets or outlets 17 (FIGURE 4) equal to the number of pilot lights to be supplied therefrom. The entire pilot light apparatus including distributor tube or pipe, pilot light member and housing is conventionally known as the harness.

All of the above is old and, per se, forms no part of the present invention.

Figure 2:
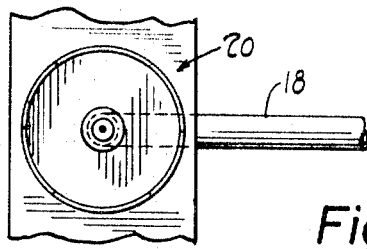
FIGURE 2 is a plan view, on an enlarged scale, of the pilot housing and mounting embodying this invention.

Valve and tube assembly 1 includes a small tube or pipe 18 (FIGURES 2 and 3) formed of suitable material, such as aluminum, and providing a gas conduit between the filter 15 and the pilot light, indicated generally at 20, embodying this invention.

In order to obtain the objects and advantages of this invention and provide a simple, effective, efficient and low cost pilot light 20, tube 18 is provided, at its outer end 21, with external threads 22, and, just inwardly thereof, with an external shoulder 24. Shoulder 24 is adapted to function as a stop for positioning and mounting or supporting the pilot light on the stove. Accordingly, end 21 of tube 18 extends through an aperture 25 in a support or bar 26, which is a part of the structure of stove 2. Aperture 25 has a diameter greater than the external diameter of threads 22 but less than external diameter of stop or shoulder 24. Thus ends 21 can only enter into aperture 25 until support 26 seats on shoulder 24. End 21 and threads 22 extend outwardly from shoulder 24 and above support 26 sufficiently so that threads 22 may be engaged and tightened upon above the support.

Shoulder 24 is formed integrally wtih and as a unitary part of tube 18, just inwardly of threads 22, by swagging, or other suitable means.

The pilot burns at one or more small orifices 28 provided at the end 21 of tube 18. The flame is protected, the pilot light mounting completed and the pilot light held in place by means of a pilot light housing 30. Housing 30 is conveniently shaped and formed from a single piece of sheet metal to provide a cup-like member having bottom 31 and side wall 32. Bottom 31 is of greater external diameter than aperture 25 and has a central aperture 34 surrounded by an internally extending wall or sleeve 35 having threads 36 which are complimentary to and engage threads 22 so that housing 30 may be tightened upon threads 22 and against support 26 to mount and hold the pilot light in position.

End 21 of tube 18 preferably extends, as shown, above threads 22 a short distance so as to position the flame higher within housing 30 and housing 30 is preferably provided with apertures or inlets 37 in wall 32 so that air may flow into the housing from below the level of the flame to provide a proper oxygen supply therefor.

Thus this invention provides a simple, efficient and economical pilot light, housing and mounting for valve and tube assemblies for stoves, and the like, comprising only a tube and the pilot housing member and obviating the need for separate washers, nuts or other members.

As noted above, valve and tube assembly 1 also includes a new and improved valve and coupling for coupling the pilot light tube to the filter 15 and controlling the flow of gas from the manifold to the pilot light.

The valve embodying a preferred form of this invention comprises a single fitting 40 extending axially from the end of tube 18 and obviating the need for a separate coupling and valve mechanism while providing a wide range of easily adjusted flow control, including stoppage of all flow, without leakage or similar danger. Further, fitting 40 in the preferred embodiment of this invention, also, provides for relative rotational movement between the tube 18 and the filter 15, thereby providing both swiveling or rotation of the pilot light relative to the filter and adjustment of the valve with attendant rotation of the fitting 40 relative to the tube 18 without otherwise disturbing the completed assembly, introducing gas leaks or interfering with the pilot light, and the valve and tube assembly, its mounting on the stove connection with the manifold and/or its function.

Figure 4:
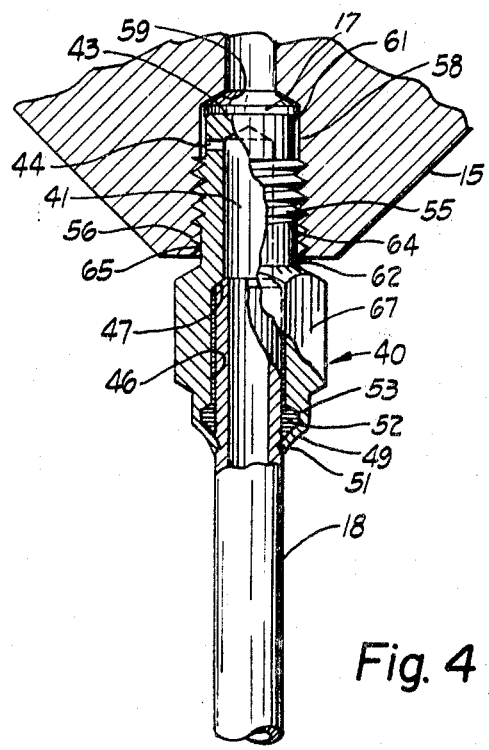
FIGURE 4 is an enlarged view, partly in elevation and partly in section, showing a valve embodying this invention.

More particularly, as best seen in FIGURE 4, fitting 40 is of generally cylindrical shape with a hollow interior 41 which is in direct communication with the interior of tube 18. Interior 41 is closed at its outer or valve end by wall 43 and a lateral passageway or bore 44, provides an inlet to interior 41.

In order to rotatably mount fitting 40 on tube 18, the interior 41 is counterbored as at 46 to provide an interior diameter having a sliding fit with the exterior of tube 18 and a seat 47 against which the tip of the tube seats when the fitting and tube are assembled.

In addition, fitting 40 is formed with an axially extending flange or lip 49, having a greater internal diameter than counterbore 46 and length sufficient so that the lip can be deformed, as by spinning, into biting and sealing engagement with tube 18, as shown at 51. Engagement 51 is circumferential and not only prevents disengagement of the tube and fitting but also provides for swiveling or relative rotation between the fittting 40 and tube 18 to and for the purposes set forth above.

The engagement 51 is effected, on the one hand, because fitting 40 is harder than tube 18 and is rendered more effective, on the other hand, by first coating tube 18 with a sealant 52, such as a grease remaining stable up to 750° F. Tube 18 is coated with sealant 52 before fitting 40 is slipped over the end, and, as the tube is spun to effect the swivel joint by forcing lip 49 into tube 18 with a suitable tool, the sealant in part remains between the fitting and tube along the meeting cylindrical portions thereof, i.e., along counterbore 46 and in part collects in and packs and seals in the relief 53, immediately adjacent the engagement 51.

The connection between fitting 40 and tube 18 is, thus, leakproof and rotatable, and although unobvious, obtains the other objects and advantages of this invention in this respect.

In order to connect the tube 18 with the filter 15 in an adjustable, sealing engagement, fitting 40 is provided with external threads 55, spaced slightly from the end 43 of the fitting and adapted to have a loose fit with the internal threads 56 in the socket or bore 58 of the filter so that the fitting may be easily and readily engaged in and hand-tightened into the filter. The length of the fitting from end 43 to end of threads 55 remote from end 43 is less than the depth of the bore 58 between the bore seat 59 and the outer end of the threads 56, so that the fitting is not seated at the completion of hand-tightening. In addition, seat 59 is tapered and end 43 of fitting 40 is provided with a non-complementary chamfer or radius 61 so that a line engagement is effected between the fitting 40 and the seat 59 when the fitting is fully seated and tightened into the filter.

The lateral bore 44 opens intermediate the end 43 and the threads 55 of fitting 40 so that the gas, under manifold pressure, may flow about end 43 and through bore 44 into the interior 41 of fitting 40 and thence through the tube 18 to the pilot light 20, when the valve is opened, but is stopped or turned off when the chamfer 61 engages seat 59.

In order to provide a gastight seal between the fitting 40 and filter 15, when the valve is opened and in order to facilitate the engagement and mounting of the fitting (valve) and pipe in the filter, threads 55 have a loose fit with threads 56 of the filter, so that the fitting can be positioned easily in the filter and then hand-tightened for the length of the threads 55 to complete the initial engagement. Further, threads 55 are held to a relatively few in number and immediately inwardly thereof, downwardly as viewed in FIGURE 4, fitting 40 is provided with a cylindrical body portion or shank 62, which has an external diameter slightly greater than the minimum internal diameter of the threads 56 on the filter.

Thus, the fitting is easily hand-tightened for the length of the threads 55—actually until the leading edge 64 of shank 62 engages the top of the first or outermost thread of threads 56 and so the fitting is easily mounted and engaged. Further, the length of the fitting intermediate end 43 and the leading edge 64 of shank 62 is such, relative to the depth of the bore 58 in filter 15, that the end 43 and chamfer 61 of fitting 40 are spaced from seat 59 of the filter, when hand-tightened a distance greater than the distance between chamfer and seat in the open position by enought to provide a sealing engagement between the lateral wall of shank 62 and the threads 56 in the manner of this invention, when assembly of the fitting therein is completed as set forth below.

The seal develops and forms as the fitting is turned further into the socket 58, after engagement between edge 64 and outermost thread 56, by conventional means, such as a wrench. The fitting, having a greater diameter, at shank 62 and being of harder material (brass vs. aluminum, for example) deforms and distorts the tips of threads 56, as shown in FIGURE 4, at 65, for example, so that a sealing engagement is formed as the fitting is tightened until fully seated with chamfer 61 in engagement with seat 59. Further, the seal 65 is such that the fitting may be backed off to open the valve, and the valve be adjusted, without loss of seal, so that gas flowing past the open valve is diverted through the aperture 44 and, into the interior 41 of fitting 40, as set forth above.

Further, the resistance to the entry of the fitting 40 into the socket 58, as shank 62 engages and deforms the threads 56, has the effect, as applicant understands it, of displacing the threads 55 of fitting 40 outwardly relative to the threads 56 of filter 15, because of the "drag" on or resistance to the fitting, as shank 62 enters into the socket 58 with the result that the threads 55 and 56 mate and engage tightly on the outwardly side of threads 55 and the inwardly side of threads 56. And, of course, the pressure of gas within the system and on the inlet side of the valve also tends to strengthen this seal since there is no pressure on the exit side of the valve, the pilot light orifice being in free and open communication with the atmosphere, at all times.

Fitting 40, as shown, also, has the advantage of having a flat end and a large circumferential engagement (between chamfer 61 and seat 59) when closed, with the result that opening of the valve provides fast "bleeding" of the gas through the "valve opening" around the end of the fitting and into the aperture 44, interior 41 of the fitting 40 and tube 18, so that tube 18 is cleared quickly of air (filled with gas) to provide for lighting of the pilot light markedly faster than with valves now commonly used for such purposes.

Figure 3:
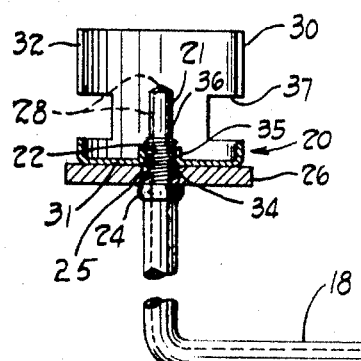
FIGURE 3 is a view, partly in elevation and partly in section, showing a tube and valve assembly embodying this invention.
Figure 3:
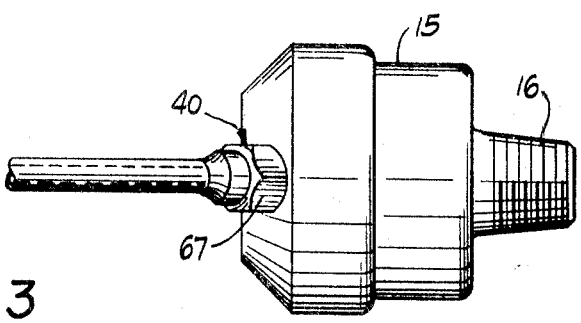

Fitting 40 is also conveniently provided with a hexagonal, as shown, or other non-circular, exterior body portion 67, FIGURES 3 and 4, in order to facilitate engagement of the fitting with a wrench, or the like, in order to tighten the same, and open and close the valve.

Further, while the valve and tube assembly of this invention has been described as a unit, it is to be understood that tubes and pilot housings, embodying this invention, may be used with other types and kinds of valves and coupling assemblies and that valves, embodying this invention, may be used with tubes having other pilot house structures and in other and different applications wherein valves obtaining the objects and advantages of this invention are or may be useful and advantageous.

I claim:
1. In a valve and tube assembly comprising a socket in a gas source, valve means, a tube having ends, and a pilot light, the improvement that said socket comprises a bore having a side wall with internal threads therein, an orifice through which gas flows into the socket, and a circular seat extending radially and axially inwardly from said side wall at an angle and surrounding said socket orifice, and said valve means comprises a fitting having an axially extending bore therein opening at one end and being closed at the other, said closed end having a chamfered edge, external threads on said fitting engaging said socket threads and being spaced from said chamfered edge, a lateral bore intermediate said chamfered edge and said fitting threads and providing a passageway for gas to enter said axial bore, said chamfer having a pitch different from the pitch of said bore seat to provide a line seal when said chamfered edge engages said seat, a cylindrical shank on said fitting rearwardly of said fitting threads, said shank having a greater external diameter than the internal diameter of said socket threads and having a leading edge spaced from said chamfered edge and the line of engagement thereof with said socket seat a lesser distance than the outermost thread of said socket is spaced from said socket seat and said line of engagement, said shank being harder than said socket threads and bending and deforming said socket threads into sealing adjustable engagement with said shank, a counterbore in said fitting extending inwardly from the end of said fitting remote from said closed end, said counterbore having an internal diameter having a sliding fit with said tube and a seat, said tube being positioned in said counterbore and against said counterbore seat, a circular flange extending axially from said fitting in a direction away from said closed end and having a greater internal diameter than the external diameter of said tube and being of harder material than said tube, said flange being bent into biting engagement with said tube and forming a relief adjacent said engagement with said tube, and a sealant disposed about said tube intermediate said tube and fitting and filling said relief, said engagement between said fitting and tube providing for relative rotation therebetween.

2. In a valve and tube assembly comprising a socket in a gas source, valve means, a tube having ends, and a pilot light, the improvements that said socket comprises a bore having a side wall with internal threads therein, an orifice through which gas flows into the socket, and a seat extending inwardly from said side wall and surrounding said socket orifice, and said valve means comprises a fitting having an axially extending bore therein opening at one end and being closed at the other, external threads on said fitting engaging said socket threads, said closed end having a pitch different from the pitch of said bore seat to provide a line seal when said end engages said seat, a cylindrical shank on said fitting rearwardly of said fitting threads, said shank having a greater external diameter than the internal diameter of said socket threads and being spaced from said closed end and the line of engagement thereof with said socket seat a lesser distance than the outermost thread of said socket is spaced from said socket seat and said line of engagement, said shank being harder than said socket threads and bending and deforming said socket threads into sealing adjustable engagement with said shank, a lateral bore intermediate said sealing engagement and said closed end and providing a passageway for gas and the like to enter said axial bore, said tube being positioned in said axial bore and having a close fit with said fitting, a circular flange extending axially from said fitting in a direction away from said closed end and having a greater internal diameter than the external diameter of said tube and being of harder material than said tube, said flange being bent into biting engagement with said tube and forming a relief adjacent said engagement with said tube, and a sealant disposed about said tube intermediate said tube and fitting and filling said relief, said engagement between said fitting and tube providing for relative rotation therebetween.

3. A valve and tube assembly comprising a body member, a fitting and a tube, said member comprising a socket or bore having a side wall with internal threads therein, an orifice through which gas, and the like, flows into the socket, and a circular seat extending radially and axially inwardly from said side wall at an angle and surrounding said socket orifice, said fitting having a hollow interior and a closed outer end with a chamfered edge, external threads on said fitting for engaging said socket threads and being spaced from said chamfered edge, a lateral bore opening intermediate said chamfered edge and said fitting threads and providing a passageway for gas, and the like, to enter into said interior of said fitting, said chamfered edge having a pitch different from the pitch of said bore seat to provide a line seal when said chamfered edge engages said seat, a cylindrical shank on said fitting adjacent said fitting threads and more remote from said closed end than said fitting threads, said shank having a greater external diameter than the internal diameter of said socket threads and being spaced from said closed end a lesser distance than the outermost thread of said socket is spaced from said socket seat, said shank being harder than said socket threads and bending and deforming said socket threads into sealing adjustable engagement with said shank, a counterbore in said fitting extending inwardly from the end of said fitting remote from said closed end, said counterbore having an internal diameter having a close fit with said tube, said tube being positioned in said counterbore, a circular flange extending axially from said fitting in a direction away from said closed end and having a greater internal diameter than the external diameter of said tube and being of harder material than said tube, said flange being bent into biting engagement with said tube and forming a relief adjacent said engagement with said tube, and a sealant disposed about said tube intermediate said tube and fitting and filling said relief, said engagement between said fitting and tube providing for relative rotation therebetween.

4. A valve and tube assembly comprising a body member, a fitting and a tube, said body member comprising a socket or bore having a side wall with internal threads therein, an orifice through which the gas flows into the socket, and a seat surrounding said socket orifice, said fitting having an axially extending bore therein open at one end and closed at the other, external threads on said fitting for engaging said socket threads, said closed end having a pitch different from the pitch of said bore seat to provide a line seal when said closed end engages said seat, a shank on said fitting adjacent said fitting threads and more remote from said closed end than said fitting threads, said shank having a greater external diameter than the internal diameter of said socket threads and being spaced from said closed end a lesser distance than the outermost thread of said socket is spaced from said socket seat, said shank being harder than said socket threads and bending and deforming said socket threads into sealing adjustable engagement with said shank, a lateral bore opening intermediate said sealing engagement and said closed end and providing a passageway for gas and the like to enter said axial bore, said tube being positioned in said axial bore and having a close, sliding fit with said fitting, a circular flange extending axially from said fitting in a direction away from said closed end and having a greater internal diameter than the external diameter of said tube and being of harder material than said tube, said flange being bent into biting engagement with said tube and forming a relief adjacent said engagement with said tube, and a sealant disposed about said tube intermediate said tube and fitting and filling said relief, said engagement between said fitting and tube providing for relative rotation therebetween.

5. A valve and connector means for connecting a tube to a body member having a socket, said valve and connector means comprising a fitting having a generally cylindrical shape with a hollow interior and a closed outer end with a chamfered edge, external threads on said fitting for engaging threads on the socket with which said means is to be used, said external threads being spaced from said chamfered edge, a lateral bore intermediate said chamfered edge and said fitting threads and providing a passageway for gas to enter into said interior of said fitting, said chamfered edge being adapted to engage a seat in the socket and having a pitch different from the pitch of the seat to provide a line seal when said chamfered edge engages the seat, a cylindrical shank on said fitting rearwardly of said fitting threads, said shank having a greater external diameter than the internal diameter of the threads of the socket and having a leading edge spaced from said chamfered edge a lesser distance than the outermost thread of the socket is spaced from the socket seat, said shank being harder than the socket threads for bending and deforming the socket threads into sealing, adjustable engagement with said shank when said fitting enters into the socket, a counterbore in said fitting extending inwardly from the end of said fitting remote from said closed end, said counterbore having an internal diameter having a sliding fit with the tube with which said valve and connector is to be used and a seat, the tube being positioned in said counterbore and against said seat, a circular flange extending axially from said fitting in a direction away from said closed end and having a greater internal diameter than the external diameter of the tube and being of harder material than the tube, said flange being bendable into biting engagement with the tube and to form a relief adjacent the engagement with said tube, the engagement between said fitting and tube providing for relative rotation therebetween.

6. A valve and connector for connecting a tube to a body member having a socket, said valve and connector comprising a fitting having an axially extending bore therein open at one end and closed at the other, external threads on said fitting for engaging the threads in the socket with which said valve and connector is to be used, said closed end having a pitch different from the pitch of a seat in the socket to provide a line seal when said closed end engages the seat, a shank on said fitting more remote from said closed end than said fitting threads, said shank having a greater external diameter than the internal diameter of the socket threads and being spaced from said closed end a lesser distance than the outermost thread of the socket is spaced from the socket seat, said shank being harder than the socket threads for bending and deforming the socket threads into sealing, rotatably adjustable, engagement with said shank, a lateral bore opening intermediate said shank and said closed end and providing a passageway for gas, and the like, to enter said axial bore, said open end of said axial bore having a diameter to have a close, sliding fit with the tube with which said valve and connector is to be used when the tube is disposed therein and a circular flange extending axially from said fitting in a direction away from said closed end and having a greater internal diameter than the external diameter of the tube and being of harder material than the tube, said flange being bendable into biting engagement with the tube and to form a relief adjacent the engagement with said tube, the engagement between said fitting and tube providing for relative rotation therebetween.

7. A valve and tube assembly comprising valve and connector means and a tube, said valve and connector means comprising a fitting having a generally cylindrical shape with a hollow interior and a closed outer end with a chamfered edge, external threads on said fitting for engaging threads on a socket with which said means is to be used, said external threads being spaced from said chamfered edge, a lateral bore intermediate said chamfered edge and said fitting threads and providing a passageway for gas to enter into said interior of said fitting, said chamfered edge being adapted to engage a seat in the socket and having a pitch different from the pitch of the seat to provide a line seal when said chamfered edge engages the seat, a cylindrical shank on said fitting rearwardly of said fitting threads, said shank having a greater external diameter than the internal diameter of the threads of the socket and having a leading edge spaced from said chamfered edge a lesser distance than the outermost thread of the socket is spaced from the socket seat, said shank being harder than the socket threads for bending and deforming the socket threads into sealing adjustable engagement with said shank when said fitting enters into the socket, a counterbore in said fitting extending inwardly from the end of said fitting remote from said closed end, said counterbore having an internal diameter having a sliding fit with said tube and a seat, said tube being positioned in said counterbore and against said counterbore seat, a circular flange extending axially from said fitting in a direction away from said closed end and having a greater internal diameter than the external diameter of said tube and being of harder material than said tube, said flange being bent into biting engagement with said tube and forming a relief adjacent said engagement with said tube, and a sealant disposed about said tube intermediate said tube and fitting and filling said relief, said engagement between said fitting and tube providing for relative rotation therebetween.

8. A valve and tube assembly comprising valve and connector means and a tube, said valve and connector means comprising a fitting having an axially extending bore therein open at one end and closed at the other, external threads on said fitting for engaging internal threads in a socket with which said fitting is to be used, said closed end having a pitch different from the pitch of a seat in said socket to be engaged during use to close the valve to provide a line seal when said closed end engages said seat, a shank on said fitting adjacent said fitting threads and more remote from said closed end than said fitting threads, said shank having a greater external diameter than the internal diameter of said socket threads and being spaced from said closed end a lesser distance than the outermost thread of said socket is spaced from said socket seat, said shank being harder than said socket threads for bending and deforming said socket threads into sealing adjustable engagement with said shank, a lateral bore opening intermediate said shank and said closed end and providing a passageway for gas and the like to enter said axial bore, said tube being positioned in said axial bore and having a close, sliding fit with said fitting, a circular flange extending axially from said fitting in a direction away from said closed end and having a greater internal diameter than the external diameter of said tube and being of harder material than said tube, said flange being bent into biting engagement with said tube and forming a relief adjacent said engagement with said tube, and a sealant disposed about said tube intermediate said tube and fitting and filling said relief, said engagement between said fitting and tube providing for relative rotation therebetween.

9. A valve comprising a body member having a socket and a fitting, said socket comprising a bore having a side wall with internal threads therein, an orifice through which fluid flows into the socket, and a circular seat extending radially and axially inwardly from said side wall at an angle and surrounding said socket orifice, said fitting comprising a unitary body member having an axially extending bore therein and being closed at one end, a chamfered edge on said closed end, external threads on said fitting engaging said socket threads and being spaced from said chamfered edge, a lateral bore intermediate said chamfered edge and said fitting threads and providing a passageway for fluid to enter said axial bore, said chamfer having a pitch different from the pitch of said bore seat to provide a line seal when said chamfered edge engages said seat, and a cylindrical shank on said fitting more remote from said chamfered edge than said fitting threads, said shank having a greater external diameter than the internal diameter of said socket threads and having a leading edge spaced from said chamfered edge and the line of engagement thereof with said socket seat a lesser distance than the outermost thread of said socket is spaced from said socket seat and said line of engagement, said shank being harder than said socket threads and bending and deforming said socket threads into sealing, rotatably adjustable engagement with said shank.

10. A valve comprising a body member having a socket and a fitting, said socket comprising a bore having a side wall with internal threads therein, an orifice through which fluid flows into the socket, and a seat extending inwardly from said side wall and surrounding said socket orifice, said fitting having a bore therein and being closed at one end, external threads on said fitting engaging said socket threads, said closed end and seat providing a seal when said end engages said seat, a cylindrical shank on said fitting more remote from said closed end than said fitting threads, said shank having a greater external diameter than the internal diameter of said socket threads and being spaced from said closed end and the place of engagement thereof with said socket seat a lesser distance than the outermost thread of said socket is spaced from said socket seat and said place of engagement, said shank being harder than said socket threads and bending and deforming said socket threads into sealing, rotatably adjustable engagement with said shank, and a lateral bore in said fitting intermediate said shank and said closed end and providing a passageway for fluid to enter said fitting bore.

11. A valve and tube assembly comprising a body member, a fitting and a tube, said body member comprising a socket or bore having a side wall with internal threads therein, an orifice through which the gas flows into the socket, and a seat surrounding said socket orifice, said fitting having an axially extending bore therein open at one end and closed at the other, external threads on said fitting for engaging said socket threads, said closed end and bore seat providing a seal when said closed end engages said seat, a shank on said fitting adjacent said fitting threads and more remote from said closed end than said fitting threads, said shank having a greater external diameter than the internal diameter of said socket threads and being spaced from said closed end a lesser distance than the outermost thread of said socket is spaced from said socket seat, said shank being harder than said socket threads and bending and deforming said socket threads into sealing adjustable engagement with said shank, a lateral bore opening intermediate said sealing engagement and said closed end and providing a passageway for gas and the like to enter said axial bore, said tube being positioned in said axial bore and having a close, sliding fit with said fitting, a circular flange extending axially from said fitting in a direction away from said closed end and having a greater internal diameter than the external diameter of said tube and being of harder material than said tube, said flange being bent into biting engagement with said tube and forming a relief adjacent said engagement with said tube, and a sealant disposed about said tube intermediate said tube and fitting and filling said relief, said engagement between said fitting and tube providing for relative rotation therebetween.

12. A valve and tube assembly comprising valve and connector means and a tube, said valve and connector means comprising a fitting having a generally cylindrical shape with a hollow interior and a closed outer end, external threads on said fitting for engaging threads on a socket with which said means is to be used, said external threads being spaced from said closed end, a lateral bore intermediate said closed end and said fitting threads and providing a passageway for gas to enter into said interior of said fitting, said closed end being adapted to engage a seat in the socket to provide a seal when said closed end engages the seat, a cylindrical shank on said fitting rearwardly of said fitting threads, said shank having a greater external diameter than the internal diameter of the threads of the socket and having a leading edge spaced from said closed end a lesser distance than the outermost thread of the socket is spaced from the socket seat, said shank being harder than the socket threads for bending and deforming the socket threads into sealing, rotatably adjustable engagement with said shank when said fitting enters into the socket, a counterbore in said fitting extending inwardly from the end of said fitting remote from said closed end, said counterbore having an internal diameter having a sliding fit with said tube and a seat, said tube being positioned in said counterbore and against said counterbore seat, a circular flange extending axially from said fitting in a direction away from said closed end and having a greater internal diameter than the external diameter of said tube and being of harder material than said tube, said flange being bent into biting engagement with said tube and forming a relief adjacent said engagement with said tube, and a sealant disposed about said tube intermediate said tube and fitting and filling said relief, said engagement between said fitting and tube providing for relative rotation therebetween.

References Cited

UNITED STATES PATENTS

| | | | |
|---|---|---|---|
| 678,792 | 7/1901 | Girardville | 251—351 |
| 1,423,418 | 7/1922 | Grikscheit | 251—346 |
| 2,046,828 | 7/1936 | Leins et al. | 158—115 |
| 2,121,268 | 6/1938 | Shaffer | 251—346 |
| 2,454,557 | 11/1948 | Jacobson | 285—382 XR |
| 2,873,941 | 2/1959 | Kortchmar | 251—148 |
| 2,962,038 | 11/1960 | Bird | 251—346 XR |
| 3,208,136 | 9/1965 | Joslin | 29—458 |
| 3,321,178 | 5/1967 | Pinke et al. | 251—347 |

FOREIGN PATENTS 589,294  3/1959  Italy.

SAMUEL SCOTT, Primary Examiner

U.S. Cl. X.R.

251—346; 285—275; 431—191